(12) United States Patent
Kim et al.

(10) Patent No.: US 6,239,420 B1
(45) Date of Patent: May 29, 2001

(54) TARGET FOR LASER CATHODE RAY TUBE AND FABRICATION METHOD THEREOF

(75) Inventors: Tae-sung Kim, Suwon; Keon-young Lee, Seoul; Chung-dam Song, Suwon, all of (KR)

(73) Assignee: Samsung Display Devices Co., Ltd., Kyungki-do (KR)

( * ) Notice: Subject to any disclaimer, the term of this patent is extended or adjusted under 35 U.S.C. 154(b) by 0 days.

(21) Appl. No.: 09/321,747

(22) Filed: May 28, 1999

(30) Foreign Application Priority Data

May 30, 1998 (KR) .................................................. 98-20026

(51) Int. Cl.$^7$ ...................................................... H01J 40/14
(52) U.S. Cl. .................... 250/207; 250/214 LA; 313/376
(58) Field of Search .......................... 250/207, 214 LA, 250/214 R, 214 VT; 372/36, 38, 41, 43, 45, 49, 50; 313/376, 385, 373, 371

(56) References Cited

U.S. PATENT DOCUMENTS 6,146,992 * 11/2000 Lauterbach et al. ................. 438/623

* cited by examiner

*Primary Examiner*—Que T. Le
(74) *Attorney, Agent, or Firm*—Lowe Hauptman Gilman & Berner, LLP (57) ABSTRACT

There is provided a method for fabricating a target for a laser cathode ray tube including the steps of (a) polishing one plane of a semiconductor layer, (b) forming a first mirror on the polished plane of the semiconductor layer, (c) forming an adhesion layer made of a bisbenzocyclobutene solution on top of a radiation layer, (d) adhering the adhesion layer and the first mirror to each other, (e) polishing the other surface of the semiconductor layer, and (f) forming a second mirror on the other surface of the semiconductor layer.

7 Claims, 7 Drawing Sheets

TARGET FOR LASER CATHODE RAY TUBE AND FABRICATION METHOD THEREOF

BACKGROUND OF THE INVENTION

1. Field of the Invention

The present invention relates to a target for a laser cathode ray tube (CRT) with improved efficiency by improving an adhesion layer for adhering a laser projecting portion and a radiation layer to each other, and a fabrication method thereof.

2. Description of the Related Art

In general, a conventional laser CRT includes a tube in which an electron gun is installed, a bulb integrally welded with the tube and a target portion for generating a laser beam by collision of electron beams emitted from the electron gun.

Figure 1:
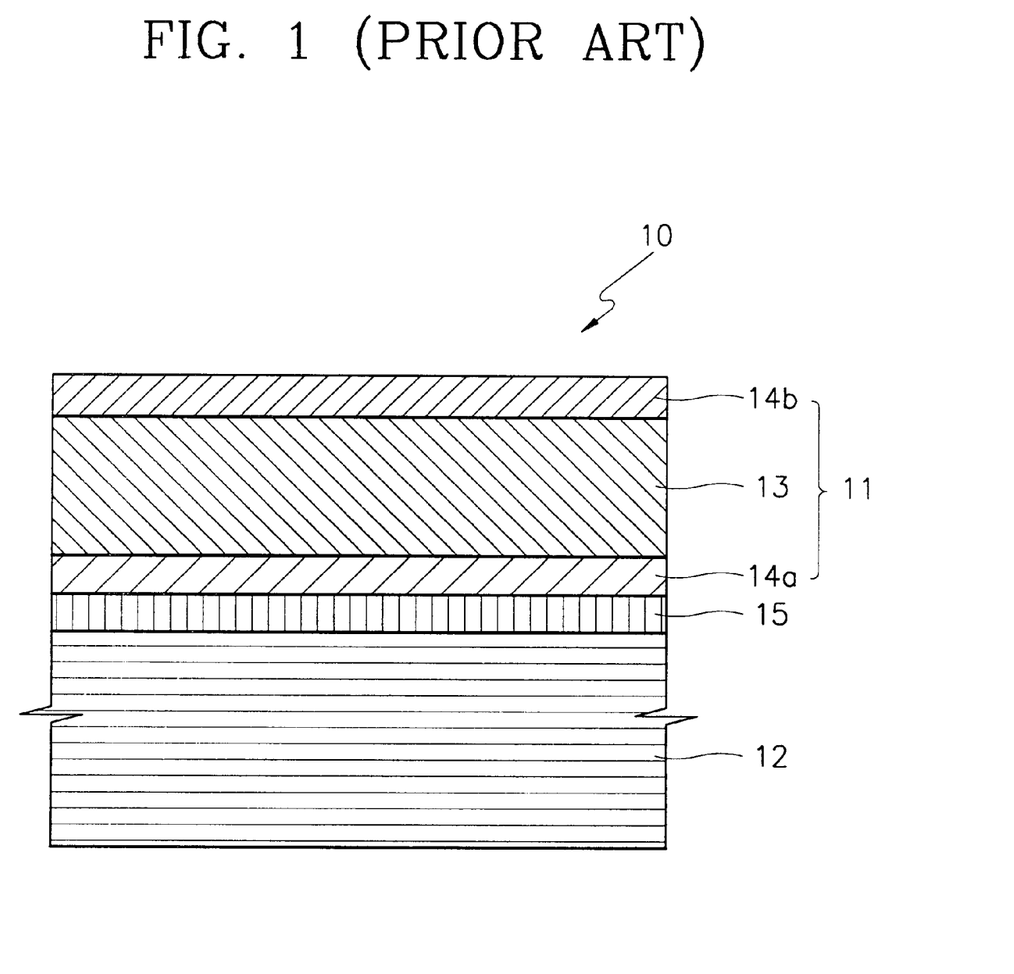
FIG. 1 is a cross-sectional view illustrating a conventional target for a laser CRT.

FIG. 1 shows a target 10 for a conventional laser CRT, including a laser projecting portion 11, a radiation layer 12 and an adhesion layer 15.

The laser projecting portion 11 is comprised of a semiconductor layer 13 made of a single crystal such as CdS, CdSSe or ZnSe, and first and second mirrors 14a and 14b respectively fixed on the bottom and top surfaces of the semiconductor layer 13. The radiation layer 12 is made of sapphire so that the heat generated from the laser projecting portion 11 is conducted and emanated.

The first mirror 14a of the laser projecting portion 11 is adhered to the radiation layer 12 by the adhesion layer 15. Here, the adhesion layer 15 serves to transmit the heat generated from the laser projecting portion 11 to the radiation layer 12 and acts as a buffer layer when polishing a surface of the semiconductor layer 13. Also, the adhesion layer 15 maintains the flatness of the laser projecting portion 11 during the polishing process. A laser generated from the laser projecting portion 11 is transmitted through the adhesion layer 15.

During the operation of the conventional laser CRT, when a voltage is applied to an electron gun (not shown), an electron beam is emitted from the electron gun to the laser projecting portion 11. The electron beam impinges on the semiconductor layer 13 to thus excite electrons, thereby generating light. The generated light resonates between the first and second mirrors 14a and 14b and is emitted as a laser beam. Then, the laser beam penetrates the radiation layer 12 and is projected onto a screen through a lens (not shown).

Here, the heat generated from the semiconductor layer 13 is conducted to the radiation layer 12 through the adhesion layer 15 to then be emitted to the outside. Conventionally, transparent epoxy glue having a shear stress of 1 Kg per unit area, has been used as the adhesion layer 15. The adhesiveness and light transmittance of the optical glue tend to be noticeably reduced at a temperature of 150° C. or higher. Thus, the processing or driving temperature at which the laser CRT is driven is limited to the range of −200~150° C.

During fabrication of a laser CRT, the inside of the laser CRT must be maintained at a high-vacuum state while being applied to a high-temperature furnace. However, since the upper limit temperature is limited to the above temperature range, it is rather difficult to achieve a high-vacuum state.

Also, while a laser CRT is driven, since an adhesion layer cannot withstand heat immediately applied by electrons at a high voltage, the degree of the vacuum state of a bulb is lowered.

SUMMARY OF THE INVENTION

To solve the above problems, the present invention provides a target for a laser CRT having an improved adhesion layer for adhering a laser projecting portion and a radiation layer to each other, and a fabrication method thereof.

Accordingly, to achieve the above objective, there is provided a method for fabricating a target for a laser cathode ray tube including the steps of (a) polishing one plane of a semiconductor layer, (b) forming a first mirror on the polished plane of the semiconductor layer, (c) forming an adhesion layer made of a bisbenzocyclobutene solution on top of a radiation layer, (d) adhering the adhesion layer and the first mirror to each other, (e) polishing the other surface of the semiconductor layer, and (f) forming a second mirror on the other surface of the semiconductor layer.

According to another aspect of the present invention, there is provided a target for a laser cathode ray tube including a laser projecting portion comprised of a semiconductor layer, and first and second mirrors formed on bottom and top surfaces of the semiconductor layer, a radiation layer from which the heat generated from the semiconductor layer is emitted to the outside, and an adhesion layer interposed between the laser projecting portion and the radiation layer and formed of a bisbenzocyclobutene solution.

BRIEF DESCRIPTION OF THE DRAWINGS

The above objective and advantages of the present invention will become more apparent by describing in detail a preferred embodiment thereof with reference to the attached drawings in which.

DESCRIPTIONS OF THE PREFERRED EMBODIMENT

Figure 2A:
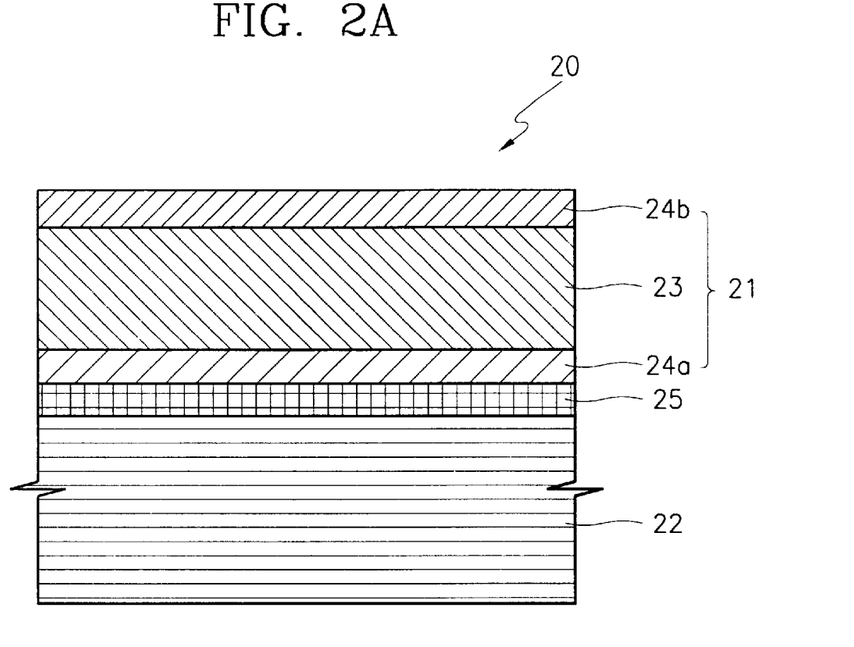
FIG. 2A is a cross-sectional view illustrating a target for a laser CRT according to the present invention.

FIG. 2A illustrates a target 20 employed in a laser CRT according to a preferred embodiment of the present invention. The target 20 is comprised of a laser projecting portion 21 and a radiation layer 22. The laser projecting portion 21 includes a semiconductor layer 23 from which a laser beam is generated. The semiconductor layer 23 is formed of a II—IV group compound of a single crystal such as CdS, ZnSe, CdSSe, ZnCdS or ZnCdSe.

First and second mirrors 24a and 24b are deposited on the bottom and top surfaces of the semiconductor layer 23, respectively. The first and second mirrors 24a and 24b amplify the laser beam generated from the semiconductor layer 23.

The radiation layer 22 is preferably made of sapphire so as to easily radiate the heat generated from the semiconductor layer 23.

An adhesion layer 25 is interposed between the laser projecting portion 21 and the radiation layer 22. According to the features of the present invention, the adhesion layer 25 includes bisbenzocyclobutene polymers.

In other words, the adhesion layer 25 is formed using a solution obtained by dissolving bisbenzocyclobutene in mesitylene solvent. Here, the concentration of bisbenzocyclobutene contained in the obtained solution may be set to various levels in the range of 35–70% by weight.

The viscosity of the bisbenzocyclobutene solution can be controlled by adjusting the concentration of bisbenzocyclobutene contained therein, thereby reducing the thickness of the adhesion layer 25.

Now, a method of fabricating a target for a laser CRT according to the present invention will be described.

Figure 2B:
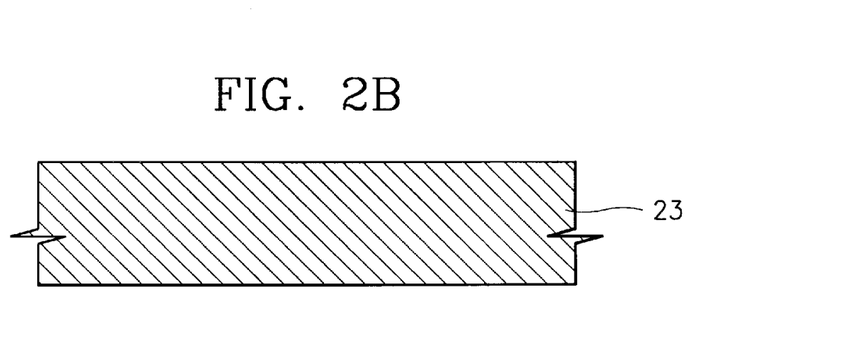
FIGS. 2B through 2E are diagrams illustrating the process of fabricating the target according to the present invention.

As shown in FIG. 2B, a single-crystal semiconductor layer 23 having a thickness of 1.5 mm is prepared and one plane (i.e., the bottom surface) thereof is polished.

Figure 2C:
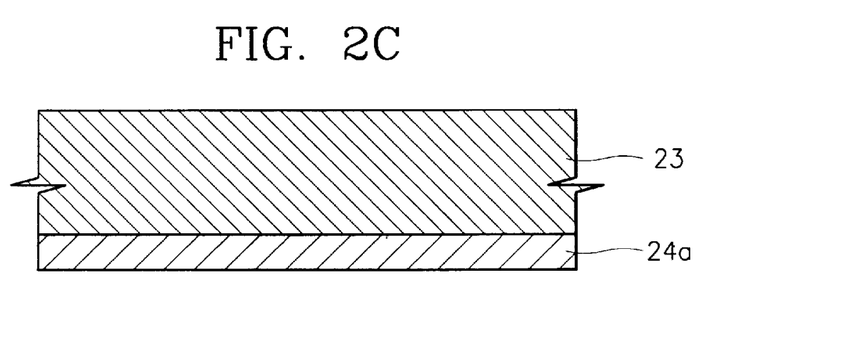

Then, as shown in FIG. 2C, a first mirror 24a is formed on the polished plane of the semiconductor layer 23. The first mirror 24a partially reflects a laser beam and is deposited in the form of a multi-layered thin film.

Figure 2D:
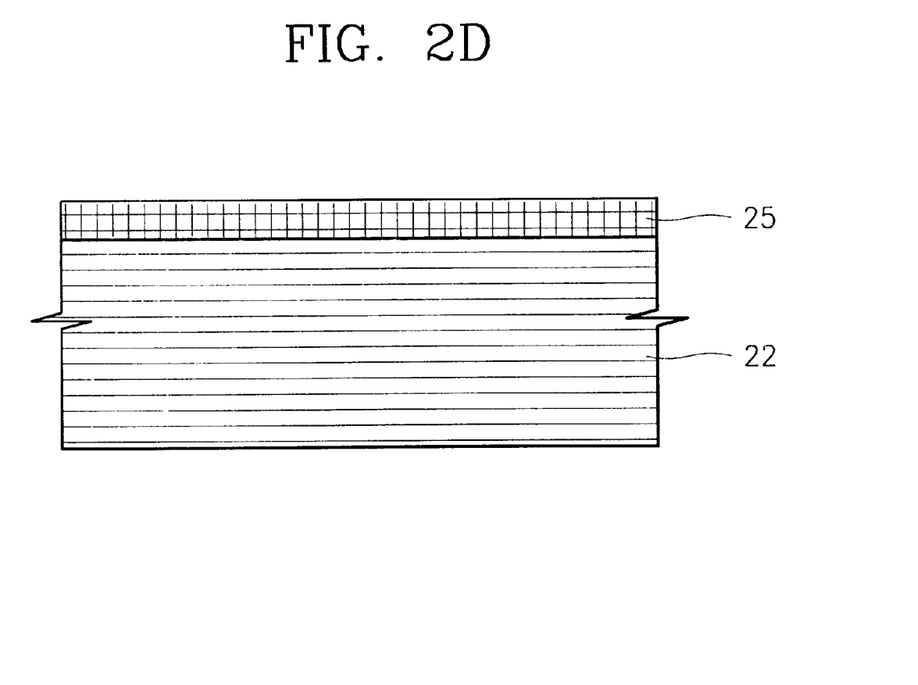

As shown in FIG. 2D, an adhesion layer 25 is formed on a radiation layer 22 for conducting and emitting the heat generated from the semiconductor layer 23 using the bisbenzocyclobutene solution. In this embodiment, a Cyclotene 3022-57 bisbenzocyclobutene solution which is available from the Dow Chemical Company of America was used.

While the radiation layer 22 is rotated at a high speed of about 5,000 RPM, the bisbenzocyclobutene solution is uniformly sprayed onto the radiation layer 22 by a spin-coating method.

Figure 2E:
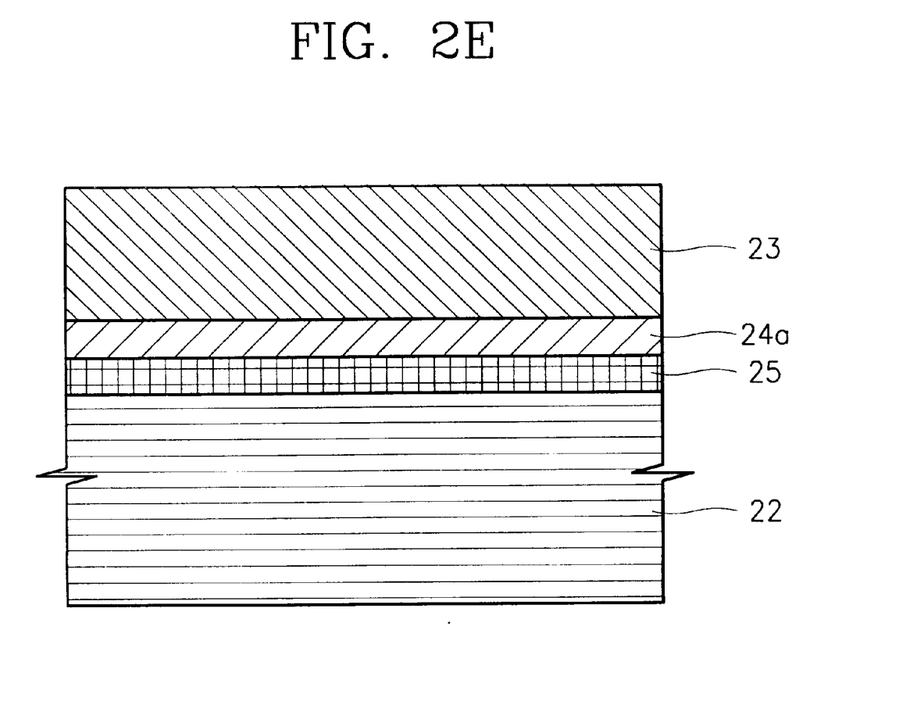

Then, as shown in FIG. 2E, the semiconductor layer 23 having the first mirror 24a and the radiation layer 22 having the adhesion layer 25 coated thereon are adhered to each other. The adhesion layer 25 is dry-baked at low and high temperatures for attaining its adhesiveness.

During a low-temperature dry-baking process, the adhesion layer 25 is dried with the furnace being maintained at 80° C. or less. When the low-temperature dry-baking process is completed, a high-temperature dry-baking process in which the temperature of the furnace is raised to 250° C. or less and maintained at the temperature for about 2 hours, is performed. Here, the furnace is kept in a nitrogen atmosphere or a vacuum state. The temperature of the furnace during the high-temperature dry-baking process is in the range of 200–250° C. and the holding time is appropriately set according to the temperature of the furnace. For example, when the furnace is maintained at 200° C., the holding time is preferably about 5 hours. When the baking process is performed in a vacuum state, an adhesion layer having more excellent physical properties can be obtained.

After the adhesion layer 25 is completely cured, the other plane (i.e., the top surface) of the semiconductor layer 23 is polished and a second mirror 24b is formed thereon, as shown in FIG. 2A. The second mirror 24b is formed in the form of a multi-layered thin film, which totally reflects a laser beam.

In the operation of the aforementioned laser CRT according to the present invention, if a voltage is applied to an electron gun, electron beams are emitted from the electron gun to the laser projecting portion 21. The electron beams impinge on the semiconductor layer 23 to excite electrons, thereby generating light. The light is amplified between the first and second mirrors 24a and 24b and is emitted as a laser beam to then be projected via the radiation layer 22 onto a screen through a lens (not shown).

Figure 3:
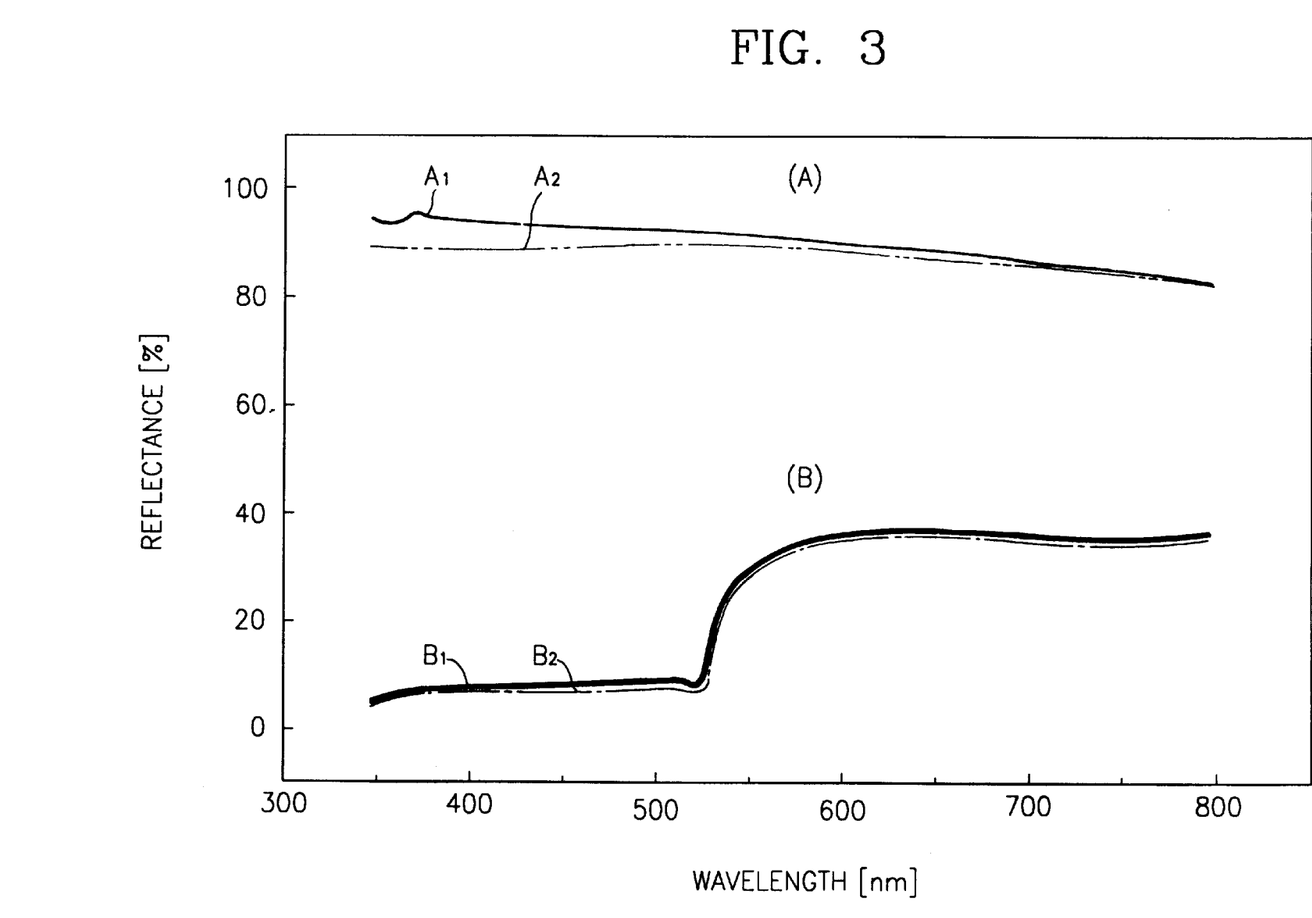
FIG. 3 is a graph illustrating the reflectance of an adhesion layer according to the present invention, depending on wavelength before and after electron-beam scanning.

FIG. 3 is a graph illustrating the change in optical properties of the adhesion layer according to the present invention, in which lines $A_1$ and $A_2$ are for the case of a sample (A) prepared by adhering a glass and an aluminum layer to each other by the adhesion layer 25 of the present invention, and lines $B_1$ and $B_2$ are for the case of a sample (B) prepared by adhering a glass and a semiconductor layer having alumina ($Al_2O_3$) and aluminum (Al) sequentially coated on its top surface to each other by the adhesion layer 25 of the present invention.

The spectroscopic apparatus used for measuring the optical transmittance in the wavelength range of visible light in the present invention is a UV-visible spectrometer. In FIG. 3, the x-axis indicates wavelength and the y-axis indicates reflectance.

As shown in FIG. 3, in both cases of the samples A and B, when the curves $A_1$ and $B_1$ indicating the reflectance of each sample before electron-beam scanning are compared with the curves $A_2$ and $B_2$ indicating the reflectance of each sample after electron-beam scanning, the result showed that little difference between optical properties due to the adhesion layer exhibited.

Figure 4:
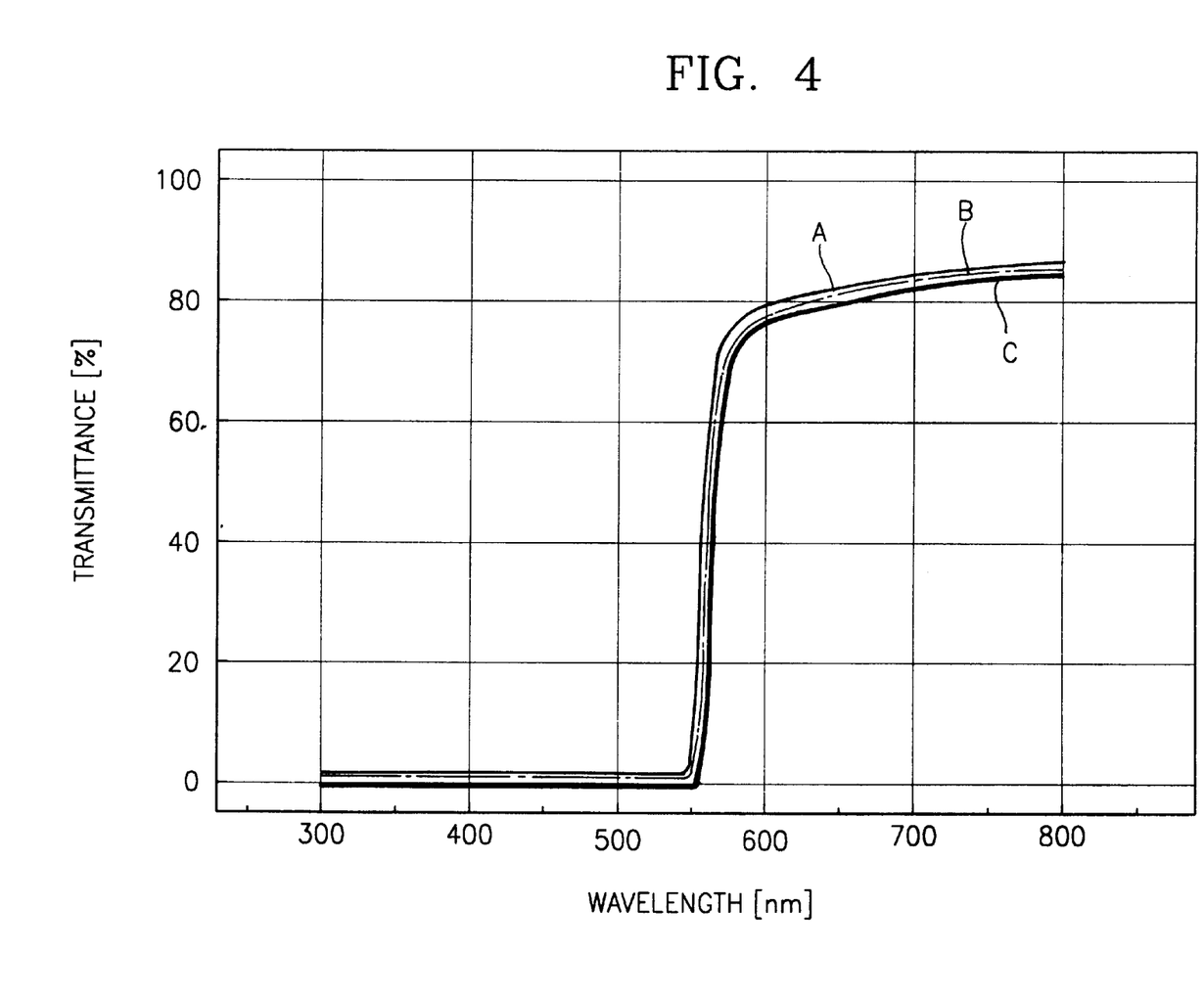
FIG. 4 is a graph illustrating the transmittance of an adhesion layer according to the present invention, depending on wavelength before and after thermal cycles.

FIG. 4 is a graph illustrating the change in transmittances of the adhesion layer according to the present invention, depending on thermal cycles. The samples used herein were prepared by adhering a semiconductor layer having mirrors on its top and bottom surfaces and a radiation layer to each other by the adhesion layer. In FIG. 4, the x-axis indicates wavelength and the y-axis indicates transmittance. The measuring instrument used herein is a UV-visible spectrometer.

As shown in FIG. 4, when the cases before a thermal cycle, after 10 thermal cycles and 20 thermal cycles, respectively indicated by A, B and C, are compared under the conditions for driving the laser CRT, the result showed that there was little change in transmittances depending on wavelengths.

Figure 5:
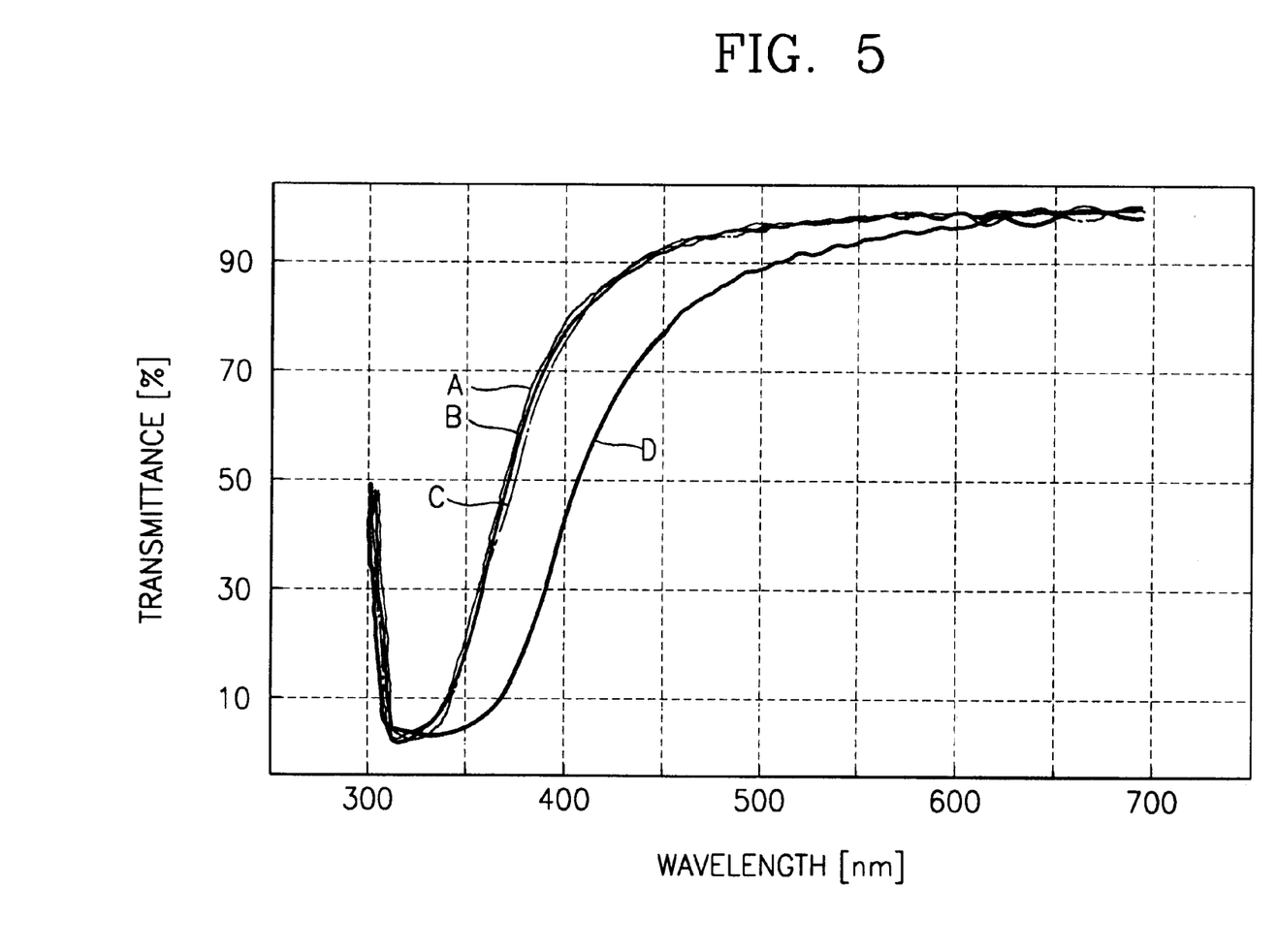
FIG. 5 is a graph illustrating the transmittance of an adhesion layer according to the present invention, depending on wavelength at low and high temperatures.

FIG. 5 is a graph illustrating the change in optical properties of the adhesion layer according to the present invention, depending on the change in temperature, in which the x-axis indicates wavelength and the y-axis indicates transmittance.

As shown in FIG. 5, in the cases of annealing the adhesion layer in a nitrogen atmosphere maintained at 200° C., cooling the adhesion layer to an extremely low temperature of −193~−183° C. in a vacuum state, and annealing the adhesion layer in a nitrogen atmosphere maintained at 350° C., respectively indicated by A, B and C, excellent optical transmittance exceeding 90% was exhibited in the wavelength range of 450~700 nm corresponding to the wavelength range of visible light.

On the other hand, in the case of annealing the adhesion layer in an atmospheric state at 350° C., indicated by D, the optical transmittance depending on wavelength is lowered a little, compared to the cases A, B and C. This is due to the fact that when the adhesion layer 25 is heated in an atmospheric state at a high temperature, the color of the adhesion layer 25 changes and light absorption of the same increases due to its exposure to oxygen in the air.

Figure 6:
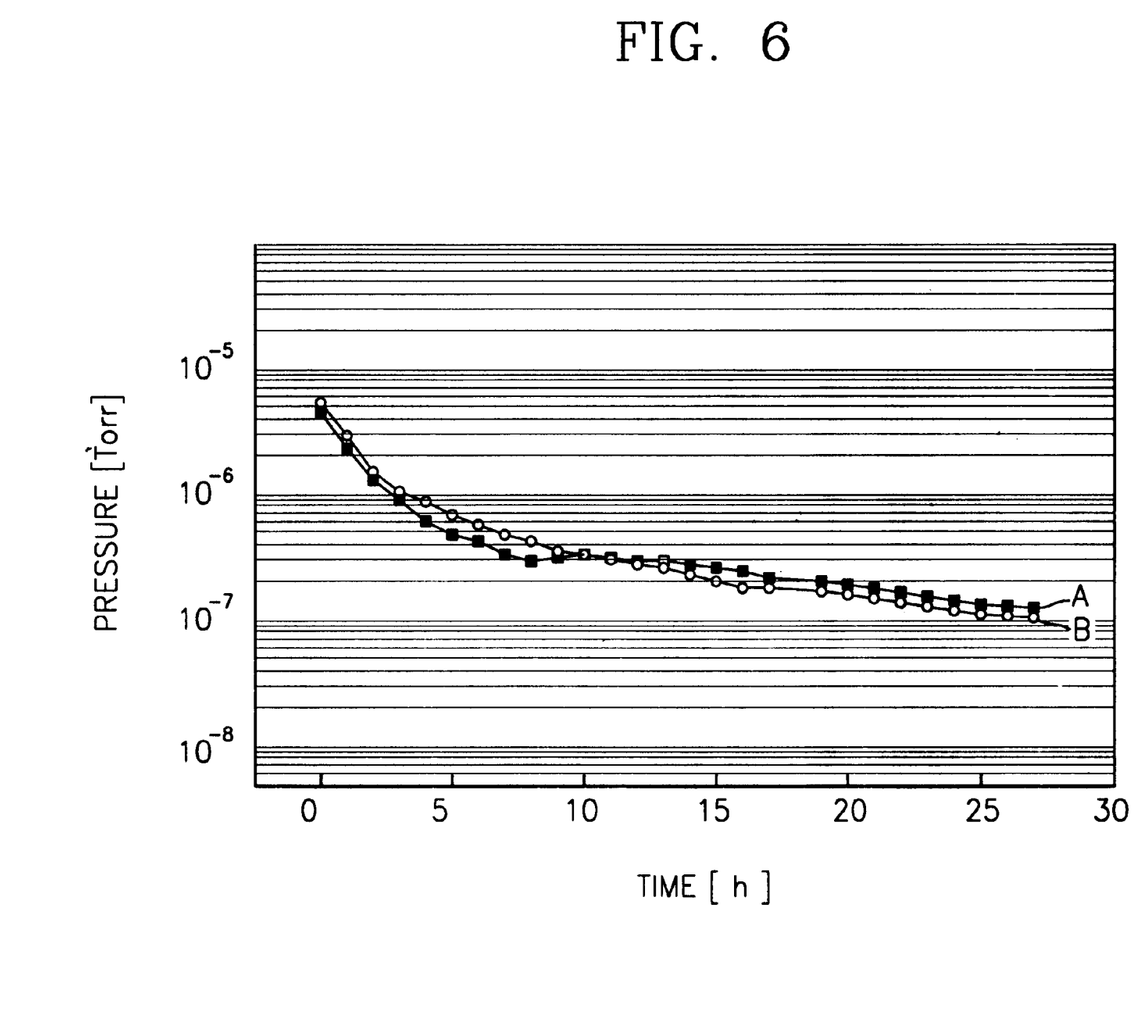
FIG. 6 is a graph illustrating the degree of the vacuum state of the laser CRT having the target according to the present invention, in accordance with thermal evacuation.

FIG. 6 shows the degree of the vacuum state of a laser CRT having the adhesion layer according to the present invention, in accordance with thermal evacuation. This experiment was carried out to investigate the degree of the vacuum state of the laser CRT at a temperature of 150° C. and 250° C.

The result of measuring internal pressures of the vacuum-exhausted laser CRT showed that a high-vacuum state of less than $10^{-6}$ Torr was kept in both cases of a sample (A), the vacuum pressure of which was investigated at 150° C., and a sample (B), the vacuum pressure of which was investigated at 250° C., without ejecting a gas.

In addition, to confirm whether the characteristics of the adhesion layer were degraded or not in accordance with irradiation conditions of high-energy electrons, electrons were irradiated onto the adhesion layer with a high voltage of 45 keV and then the degree of the vacuum state of the adhesion layer and the physical properties thereof were measured. The result showed that the degree of the vacuum state of less than $10^{-6}$ Torr was kept and the chemical structure of the adhesion layer was not changed.

Also, the result revealed that no defects such as micropores of 10 μm or greater, which may cause irregular reflection or refraction, were not produced in the adhesion layer.

The adhesion layer of the target for a laser CRT according to the present invention has excellent optical transmittance of 90% or higher with respect to wavelengths of visible light and an adhesiveness strong enough to withstand a polishing process. Also, the adhesion layer does not cause irregular reflection or refraction of light, nor are the characteristics of the adhesion layer degraded at a high temperature or at an extremely low temperature. Further, there is no gas emission under thermal-evacuation processing conditions. Also, there is no change in optical properties of the adhesion layer depending on electron-beam scanning under the conditions for driving the laser CRT.

Although a presently preferred embodiment of the present invention has been described in detail, it should be clearly understood that many variations and/or equivalents of the basic inventive concepts herein taught, which may appear to those skilled in the pertinent art, will still fall within the scope and spirit of the present invention, as defined in the appended claims.

What is claimed is:

1. A method for fabricating a target for a laser cathode ray tube comprising the steps of:

(a) polishing one plane of a semiconductor layer;

(b) forming a first mirror on the polished plane of the semiconductor layer;

(c) forming an adhesion layer made of a bisbenzocyclobutene solution on top of a radiation layer;

(d) adhering the adhesion layer and the first mirror to each other;

(e) polishing the other surface of the semiconductor layer; and (f) forming a second mirror on the other surface of the semiconductor layer.

2. The method according to claim 1, wherein in step (c), the adhesion layer is formed by a spin-coating method.

3. The method according to claim 1, wherein the step (d) further comprises the step of baking the adhesion layer adhered to the first mirror.

4. The method according to claim 3, wherein the baking includes low-temperature baking carried out at about 80° C. and high-temperature baking carried out at about 200~250° C.

5. The method according to claim 4, wherein the high-temperature baking is carried out in a furnace maintained in a nitrogen atmosphere or in a vacuum state.

6. A target for a laser cathode ray tube comprising:

a laser projecting portion comprised of a semiconductor layer, and first and second mirrors formed on bottom and top surfaces of the semiconductor layer;

a radiation layer from which the heat generated from the semiconductor layer is emitted to the outside; and an adhesion layer interposed between the laser projecting portion and the radiation layer and formed of a bisbenzocyclobutene solution.

7. The target according to claim 6, wherein the bisbenzocyclobutene solution is obtained by dissolving bisbenzocyclobutene in mesitylene solvent and the concentration of bisbenzocyclobutene contained in the solution is in the range of 35~70% by weight.

* * * * *